US006523001B1

(12) United States Patent
Chase

(10) Patent No.: US 6,523,001 B1
(45) Date of Patent: Feb. 18, 2003

(54) INTERACTIVE CONNOTATIVE THESAURUS SYSTEM

(76) Inventor: Wayne O. Chase, 4204 West 14th Avenue, Vancouver (CA), V6R 2X8

( * ) Notice: Subject to any disclaimer, the term of this patent is extended or adjusted under 35 U.S.C. 154(b) by 0 days.

(21) Appl. No.: 09/372,244

(22) Filed: Aug. 11, 1999

(51) Int. Cl.[7] .............................................. G06F 17/21
(52) U.S. Cl. ....................................... 704/10; 707/532
(58) Field of Search .................. 704/1, 9, 10; 707/530, 707/532, 533, 100

(56) References Cited

U.S. PATENT DOCUMENTS

| 5,781,879 | A | * | 7/1998 | Arnold et al. ................. 704/9 |
| 5,873,056 | A | * | 2/1999 | Liddy et al. .................... 704/9 |
| 5,918,222 | A | * | 6/1999 | Fukui et al. .................... 707/1 |
| 5,940,624 | A | * | 8/1999 | Kadashevich et al. ......... 704/9 |
| 6,061,675 | A | * | 5/2000 | Wical .......................... 706/45 |

* cited by examiner

Primary Examiner—Patrick N. Edouard
(74) Attorney, Agent, or Firm—Steven P. Koda

(57) ABSTRACT

A computerized interactive thesaurus reference tool is provided which retrieves connotative synonyms from a data base. Connotative synonyms are words or phrases which have the same or a similar emotional or related connotative meaning. Typically connotative synonyms have different denotative meanings. The interactive reference tool is similar to a thesaurus, but instead of relating words of similar denotative meaning, it relates terms of similar connotative meaning. The data base stores denotative context and connotative meanings of a plurality of words and phrases. Connotative meaning, along with the intensity of such meaning, are identified using a statistical model of sampled responses from select panels of evaluators. In addition, areas of human interest also are associated with a given word or phrase and its denotative meaning. Scaled ratings of the power, activity and abstract/concrete qualities of the word or phrase also are maintained.

13 Claims, 8 Drawing Sheets

INTERACTIVE CONNOTATIVE THESAURUS SYSTEM

CROSS REFERENCE TO RELATED APPLICATIONS

This invention is related to commonly-assigned U.S. patent application Ser. No. 09/372,377 filed on the same day, of W. Chase for "System for Identifying Connotative Meaning;" commonly-assigned U.S. patent application Ser. No. 09/372,549 filed on the same day, of W. Chase for "System for Quantifying Intensity of Connotative Meaning;" commonly-assigned U.S. patent application Ser. No. 09/372,243 filed on the same day, of W. Chase for "Interactive Connotative Dictionary System;" commonly-assigned U.S. patent application Ser. No. 09/372,737 filed on the same day, of W. Chase for "System for Connotative Analysis of Discourse." The content of all such applications are incorporated herein by reference and made a part hereof.

BACKGROUND OF THE INVENTION

This invention relates to a computerized interactive language reference tool, and more particularly to a system for accessing the connotative meanings of words and phrases.

Language is an abstract, rule-governed system of arbitrary symbols that can be combined in countless ways to communicate information. All languages include a system of phonology (i.e., set of sounds), semantics (i.e., word, phrase and sentence meanings), morphology (i.e., rules for combining smallest meaningful units to form or alter words), syntax (i.e., ways in which words are organized into phrases and sentences) and pragmatics (i.e., rules governing a conversation and social use of language).

The use of language enables humankind to develop advanced cognitive abilities. Cognitive development relates to the changes in a person's memory, thinking, use of language and other mental skills as they develop from infants to adults. Humans develop a certain degree of cognitive competence. In addition to such cognitive competence, humans also display and experience feelings, emotions and moods. In particular, our emotional state or the emotional state we desire to elicit can influence our choice of words. Every human language enables people to communicate both intellectually and emotionally because words and phrases convey both cognitive and affective meaning. 'Affective' means to be influenced by or result from emotions.

Linguistics is the scientific study of language. Semantics is the branch of linguistics that deals with the study of the relationship between words or phrases and their meanings. Of particular significance here are the contrasting linguistic terms, denotation and connotation. 'Denotation' is a particular meaning of a symbol. 'Connotation' is an idea or meaning suggested by or associated with a word or phrase. Thus, 'denote' describes the relation between a word or phrase and the thing it conventionally names, whereas 'connote' describes the relation between the word or phrase and the images or associations it evokes. As used herein a denotation is an objective, cognitive meaning which refers to the direct relationship between a term and the object, idea or action it designates. As used herein, a connotation is a subjective, affective meaning which refers to the emotive and associative aspect of a term.

The denotative meanings of words have been systematically codified into definitions and collected together to form dictionaries, thesauruses and related denotative language references. However, the codification of connotative meanings has not been achieved. Consider, for example, a dictionary which provides the following denotative meaning for the word 'pub'; "a building providing alcoholic drinks for consumption on the premises" (Oxford Dictionary). However, the word 'pub' simultaneously conveys a host of emotional connotations, such as merriment, pleasure, cheerfulness, perhaps some sadness, and so on. Similarly, words such as 'summer', 'love', and 'melody' have a variety of positive emotional connotative associations for most people, while words such as 'cancer', 'rape', and 'homeless' have negative emotional connotations for most people. In all cases, the associated connotations are not systematically accessible using any known language reference resource or tool.

The reason for the absence of codification of connotative meaning is that, while words readily evoke emotional connotations, the converse is not true: emotional connotations are not easily codified using words. Unlike denotative meaning, affective meaning does not naturally lend itself to systematic word-symbol description. Emotions are felt, not thought, so the relationship between a word and its associated connotative content, while real, is not codifiable using the relatively straightforward methods employed by lexicographers in fashioning denotative definitions. Accordingly, there is a need for a connotation language reference tool and a system for codifying the connotative content of such a tool.

Not only is it desirable to identify connotative meaning, it also is desirable to quantify the intensity associated with a connotation. Some words or phrases evoke stronger responses than others. Some words or phrases are more activity oriented. In the 1950s, Charles Osgood, an American psychologist developed a method of constructing bipolar scales based on semantic opposites, such as "good-bad", "soft-hard", "fast-slow," "clean-dirty," "valuable-worthless," "fair-unfair," and so on. Osgood called these scales "semantic differential" scales because they differentiated attitudinal intensity based on a person's subjective understanding of the connotative meanings of words. Osgood et al. explored large amounts of data provided by students who evaluated numerous words and phrases on numerous semantic differential scales. The outcome of Osgood's investigations was a description of the existence of "semantic space," three measurable underlying attitudinal dimensions that proved in subsequent research to be robustly identifiable across other languages and cultures. Osgood named these dimensions Evaluation, Power, and Activity (EPA). Experimentation by many investigators around the world confirmed the reality of semantic space and its cross-cultural validity (Japan, Scandinavia, Germany, Ireland etc.).

The semantic differential is a method for measuring the meaning of an object to an individual. It may also be thought of as a series of attitude scales. A subject is asked to rate a given concept (for example, 'Irish', 'Republican', 'wife', 'me as I am') on a series of seven-point bipolar rating scales. Any concept—whether it is a political issue, a person, an institution, a work of art—can be rated. Subgroups of the scales can be summed up to yield scores that are interpreted as indicating the individual's position on three underlying dimensions of attitude toward the object being rated. These dimensions have been identified by using factor-analytic procedures in examining the responses of many individuals concerning many concepts or objects. It has been found that three subgroups measure the following three dimensions of attitude: (1) the individual's evaluation of the object or concept being rated, corresponding to the favorable-unfavorable dimension in more traditional attitude scales;

(2) the individual's perception of the potency or power of the object or concept; and (3) the individual's perception of the activity of the object or concept. (See Kidder, L. H., "Research Methods in Social Relations;" 1981).

The problem with the semantic differential technique is that it does not distinguish beyond a single evaluative continuum, with positive attitude at one end of the scale through negative attitude at the other end. That is, it does not actually identify any individual emotions. Moreover, although several short "semantic differential dictionaries" have been developed (known in the literature as semantic "atlases" because they are analogous to "maps" of semantic space), consisting of 500 to 1,500 words with EPA scores for each word, the technique of semantic differential is not associated with any system or method for codifying the words of any given language, even on a single affective variable. According there is a need for a system for codifying the connotative meaning of words.

SUMMARY OF THE INVENTION

According to the invention, a computerized interactive language reference tool is provided which retrieves connotative synonyms (referred to herein as "connonyms") from a data base. Connotative synonyms are words or phrases (i.e., referred to herein as 'terms') which have the same or a similar emotional or related connotative meaning. Typically connotative synonyms have different denotative meanings. The interactive reference tool is similar to a thesaurus, but instead of relating words of similar denotative meaning, it relates terms of similar connotative meaning.

According to one aspect of the invention, a data base is generated which stores the denotative context and connotative meanings of a plurality of terms. Connotative meaning, along with the intensity of such meaning, are identified using a statistical model of sampled responses from select panels of evaluators. In addition, areas of human interest also are associated with a given term and its denotative meaning. Further, scaled ratings of the power, activity and abstract/concrete qualities of the term also are maintained.

According to another aspect of the invention, the data base content is updated over time to accommodate changing and new connotations.

According to another aspect of the invention, connotative meanings for any given term are selected from a plurality of predefined categories. In one embodiment described below for the English language there are 8 categories. In the preferred embodiment there are four categories of positive emotions (e.g., affection/friendliness, enjoyment/elation, amusement/excitement and contentment/gratitude) and four categories of negative emotions (e.g., sadness/grief, anger/loathing, fear/uneasiness, and humiliation/shame). Within each category there are a predefined list of emotional descriptors. Thus, there are a plurality of categories of emotional descriptors. A term may have a connotative meaning in any or all of the emotional categories. Some terms may not have any connotative meaning. In some embodiments only a primary emotional descriptor is permitted to be assigned for a given emotional category for a given term. Thus, for an eight category embodiment, any term can have 0 to 8 emotional descriptors—the emotional descriptors being from different emotional categories. In other embodiments a primary and a secondary emotional descriptor may be assigned for any given term. For such an embodiment, which is based on 8 emotional categories, any term can have 0–16 emotional descriptors—the emotional descriptors being in pairs, with the two emotional descriptors in a given pair being for a given emotional category. Different pairs include emotional descriptors for different emotional categories.

According to another aspect of the invention, for each emotional descriptor associated with a given term, there is an intensity rating of how strongly or intensely the term tends to promote or relate to the emotional descriptor.

According to another aspect of the invention, a user interface for the connotative language reference allows a user to retrieve connonyms for a given term. The connonyms are displayed in one portion of a display window. In another portion of the window the user is able to tab through the various emotional categories to identify the common emotional descriptors for the identified connonyms.

According to another aspect of the invention, a user can adjust the selection of connonyms by setting a parameter range for one or more of the emotional descriptors associated with the term being evaluated. Each emotional descriptor associated with a term in the data base has an intensity rating. The user is able to select an intensity range for any or all of the emotional descriptors associated with the term being evaluated. In doing so, the numbers of terms retrieved as connonyms may vary so that only those terms that have common emotional descriptors in the corresponding intensity ranges are retrieved. Thus, terms that are more strongly related in connotative meaning are identified.

According to another aspect of the invention, the list of connonyms also can be narrowed down by selecting criteria among one or more filters. There are general filters, such as denotative filters (number of syllables, parts of speech), special diction filters (e.g., slang, euphemistic, interrogative) and non-emotional connotation filters (power, activity, abstract/concrete). There also are human interest filters. There are several categories of human interest filters, such as personal identity filters (e.g., male, female, organization), spiritual identity filters (e.g., Hinduism, Christianity, Myth/legend), physical identity filters (e.g., body, health), perception filters (e.g., taste, place event) and non-human life filters (e.g., animal, plant). A user enters selections for one or more filters, typically for filters where the term being evaluated has a corresponding entry, (where the term being evaluated encompasses a given area of human interest, special diction or other quality found among the filter criteria). The connonyms which meet such filter criteria are displayed. As a result, closer and closer connonyms can be identified and retrieved.

According to another aspect of the invention, the connotative language reference, including the data base, user interface and processing filters, are stored on a computer readable storage media.

According to one advantage of the invention a large amount of connotative and denotative information is accessible to an end user in a manageable format. According to another advantage of the invention, the data is updated over time for changing connotations. In particular, for a distributed computing model of implementation, such as a global computer network, the content may be updated continually or at varying intervals.

These and other aspects and advantages of the invention will be better understood by reference to the following detailed description taken in conjunction with the accompanying drawings.

DESCRIPTION OF SPECIFIC EMBODIMENTS

A system and method are described for identifying, codifying, storing, and retrieving the connotative meaning inherent in the words and phrases of any language. Throughout this description, a preferred embodiment and examples given should be considered as exemplars rather than limitations on the method and system of the present invention.

Figure 1:
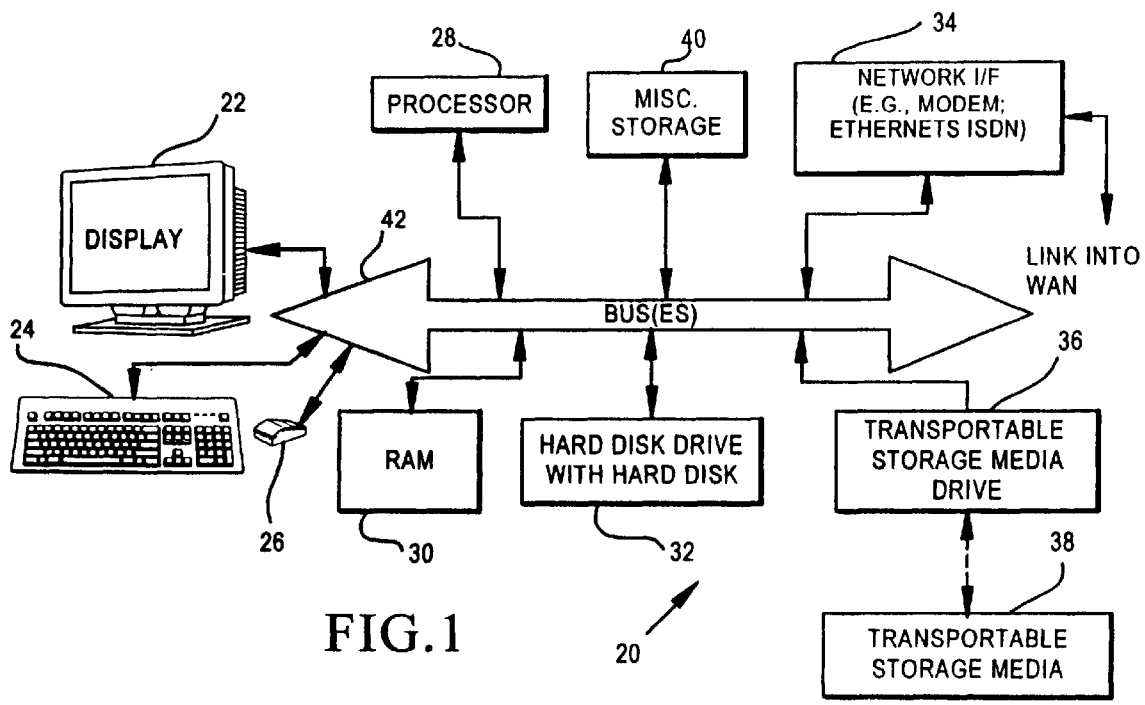
FIG. 1 is a block diagram of a host computer system.

Many of the functions of the present inventions preferably are performed by or with the assistance of a programmed digital computer of the type which is well known in the art, an example of which is shown in FIG. 1. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

The connotative language reference serves as an interactive connotative dictionary, connotative thesaurus or other language reference. For a connotative dictionary embodiment, the connotative dictionary is distinct from a 'classic' dictionary in that it lists terms with their connotative meanings. For a connotative thesaurus embodiment, the connotative thesaurus is distinct from a 'classic' thesaurus in that terms are linked as "connonyms" (i.e., connotative synonyms) when they have the same or a similar emotional or related connotative meaning, but typically have a different denotative meaning. The data bases forming a computer version of the connotative language references may be formed using custom-designed database software or database software commercially available from manufacturers such as Inprise, Oracle, Microsoft or another vendor of data base software services.

Following are sections which describe an interactive connotative thesaurus, methods for identifying connotative meanings, methods for quantifying intensity of connotative meanings, methods for maintaining data integrity, and methods for identifying human interest areas.

Connotative Thesaurus

Figure 2:
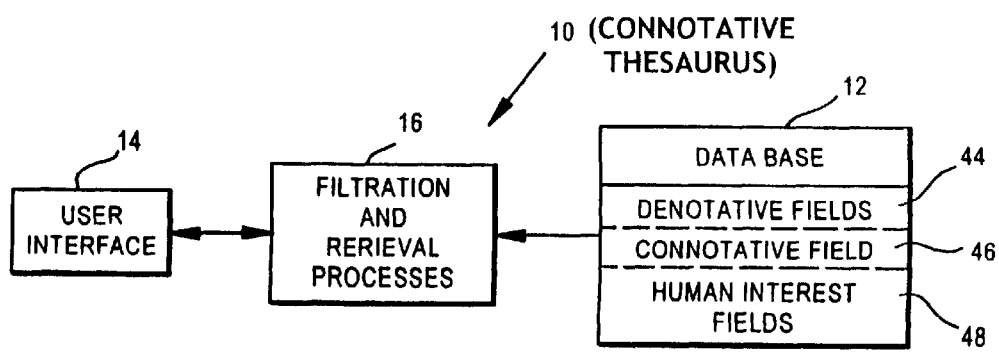
FIG. 2 is a diagram of an interactive connotative thesauris system according to an embodiment of this invention.

Referring to FIG. 2, an interactive connotative thesaurus system 10 is formed by a data base 12, a user interface 14 and various filtering and retrieval processes 16. Preferably such data base 12, interface 14 and processes 16 are implemented in electronic format as one or more software programs executed on a host computer system or over a host computer network. For example, the connotative thesaurus system 10 may be stored on an optical disc (e.g., CD-ROM) or other storage media and installed onto the host computer system or network. Specifically, the data base 12, user interface software 14 and filtering and retrieval processes 16 may be loaded and installed locally onto the host computer system or network. In some implementations the software embodying the user interface 14 and processes 16 are installed to be resident on the host computer system or network, while the data base 12 is stored and accessed from a removable storage media, such as an optical disk. In other embodiments the data base 12 is centrally located among one or more network server computers, while the user interface software 14 and processes 16 are stored and executed from either a local end user computer system or remotely at the server computer. The implementations may vary from local copies for a given end user's access to one or more copies stored on a private network or even a global computer network which users log into to access and use the interactive connotative thesaurus system.

Data Base 12;

In a preferred embodiment of the data base 12, the data base 12 includes a set of denotative fields 44, a set of connotative fields 46, and a set of human interest and miscellaneous fields 48. The denotative fields and human interest fields are not necessary, but provide additional resources for the user. In some embodiments the data base 12 includes only the set of connotative fields 46.

The set of denotative fields 44 includes at least three fields. In one implementation the denotative data is obtained from one or more electronic or print-based dictionaries in any language. Database records may be created for each word or phrase of the language, which may be the English language or any other language. In some embodiments the connotative thesaurus system may be specialized for a given subject (e.g., medical/health contexts; science). In other embodiments a general language reference is implemented. Table 1 below lists the desired fields included among the denotative fields:

TABLE 1

| Denotative Field Types |
| --- |
| 1. Term (i.e., word or phrase/idiom) |
| 2. Specific denotative context |
| 3. Part of speech |

For each record in the data base 12, one denotative field is assigned to the term. A second denotative field is assigned to the denotative context (dictionary meaning) of the term. A third denotative field is assigned to the part of speech. Preferably, each context of each term is assigned a separate database record. Thus, if the dictionary definition of a single term has two meanings among a total of five contexts, then there are five records, one for each context. There may be multiple contexts for a given dictionary meaning when, for example, there are different parts of speech for the term/meaning.

Assigning an additional field to track the meanings that subsume the contexts is not necessary to practice the invention, but such a field may be assigned in an alternative embodiment. The total number of records required is equal to the sum of all of the denotative contexts of all of the words in the dictionary source or other denotative data source or sources.

In a preferred embodiment the set of connotative fields 46 includes a block of one or more fields corresponding to each one of a plurality of emotional categories. In a best mode embodiment eight emotional categories have been identified, although the number of categories may vary to be more or less than eight. The number of fields comprising each block may vary. In one embodiment there is one field in each block that corresponds to a primary connotative emotional descriptor for the corresponding term. In some embodiments there is a field for storing a secondary connotative emotional descriptor for the corresponding term. Note that the primary and or secondary emotional descriptor can correspond to a designation of no connotative meaning stored in this emotional category for the given term.

In addition to the fields for the primary and optional secondary emotional descriptors, there also are fields associated with each block relating to the method for identifying connotative meaning. Although the method for defining connotative meaning may vary, in one embodiment the data is collected from multiple sources. In a given implementation the sources are judges or panels of judges. In some embodiments there is a field in each block for each judge's selection of the term's connotative meaning. In an example, where 24 connotative judges are used, each of the eight blocks of fields 46 includes 24 individual fields used in deriving the primary and/or secondary emotional descriptor for the term—a respective field to hold each judge's emotional descriptor data for each term in each context. Several additional fields are reserved to hold calculated data based on the connotative judges' emotional descriptor data. Fewer or more judges may be used, adjusting the number of fields within each block accordingly.

Table 2 lists eight emotional categories corresponding to the eight blocks of fields 46 for a best mode embodiment. The general emotional classification "Positive Emotions" subsumes four emotional categories, and the general emotional classification "Negative Emotions" subsumes the other four emotional categories, as practiced in a preferred embodiment of the invention. Each emotional category subsumes a list of 12 to 37 specific emotional descriptors, each of which is associated with a two-digit identifying code number. The specific code number may vary. Further, the manner in identifying the distinct descriptors also may vary. The total number of emotional descriptors in this example is 164. In various embodiments one or more emotional descriptors may be removed from this list, entire emotional categories may be removed from the list, or one or more emotional categories and descriptors may be added to this list.

The connotative descriptors that appear in Table 2 are English language connotative descriptors for one embodiment of a general language connotative thesaurus system. The specific words that make up the emotional connotative descriptors may vary. Of course such descriptors will vary from language to language.

TABLE 2

Connotative Database Fields

POSITIVE EMOTIONS:

| Affection/Friendliness | Amusement/Excitement |
|---|---|
| 01 Adoration | 01 Amazement |
| 02 Affection | 02 Amusement |
| 03 Amorousness | 03 Astonishment |
| 04 Devotion | 04 Eagerness |
| 05 Fondness | 05 Enthusiasm |
| 06 Friendliness | 06 Excitement |
| 07 Infatuation | 07 Exhilaration |
| 08 Kindliness | 08 Exuberance |
| 09 Liking | 09 Fun |
| 10 Love | 10 Glee |
| 11 Lust | 11 Hilarity |
| 12 Passion | 12 Merriment |
| 13 Tenderness | 13 Mirth |
| 14 Trust | 14 Surprise |
| 15 Warmth | 15 Thrill |
| Enjoyment/Elation | 16 Wonder |
| | Contentment/Gratitude |
| 01 Admiration | |
| 02 Bliss | 01 Appreciation |
| 03 Cheer | 02 Comfort |
| 04 Delight | 03 Contentment |
| 05 Ecstasy | 04 Gladness |
| 06 Elation | 05 Gratitude |
| 07 Enjoyment | 06 Hope |
| 08 Euphoria | 07 Peacefulness |
| 09 Exultation | 08 Relief |
| 10 Happiness | 09 Satisfaction |
| 11 Joy | 10 Serenity |
| 12 Jubilation | 11 Thankfulness |
| 13 Pleasure | 12 Well-being |
| 14 Pride | |
| 15 Rapture | |

NEGATIVE EMOTIONS

| Sadness/Grief | Fear/Uneasiness | Anger/Loathing |
|---|---|---|
| 01 Affliction | 01 Alarm | 01 Abhorrence |
| 02 Agony | 02 Anxiety | 02 Acrimony |
| 03 Anguish | 03 Apprehension | 03 Aggravation |
| 04 Dejection | 04 Desperation | 04 Anger |
| 05 Demoralization | 05 Distress | 05 Animosity |
| 06 Depression | 06 Dread | 06 Annoyance |
| 07 Desolation | 07 Fear | 07 Antagonism |
| 08 Despair | 08 Horror | 08 Antipathy |
| 09 Despondency | 09 Nervousness | 09 Aversion |
| 10 Disappointment | 10 Panic | 10 Bitterness |
| 11 Discouragement | 11 Paranoia | 11 Contempt |
| 12 Disheartenment | 12 Stress | 12 Creepiness |
| 13 Disillusionment | 13 Tension | 13 Detestation |
| 14 Dismay | 14 Terror | 14 Dissatisfaction |
| 15 Distress | 15 Uneasiness | 15 Disdain |
| 16 Downheartedness | 16 Worry | 16 Disgust |
| 17 Forlorness | Humiliation/Shame | 17 Dislike |
| 18 Gloom | | 18 Enmity |
| 19 Grief | 01 Chagrin | 19 Envy |
| 20 Heartache | 02 Contrition | 20 Exasperation |
| 21 Heartbreak | 03 Degradation | 21 Frustration |
| 22 Heartsickness | 04 Discredit | 22 Fury |
| 23 Hopelessness | 05 Disgrace | 23 Hatred |
| 24 Hurt | 06 Dishonor | 24 Hostility |
| 25 Longing | 07 Disrepute | 25 Irritation |
| 26 Melancholy | 08 Disrespect | 26 Indignation |
| 27 Misery | 09 Embarrassment | 27 Ire |
| 28 Pain | 10 Guilt | 28 Jealousy |
| 29 Pity | 11 Humiliation | 29 Loathing |
| 30 Sadness | 12 Indignity | 30 Offense |
| 31 Sorrow | 13 Mortification | 31 Outrage |
| 32 Suffering | 14 Regret | 32 Rage |

TABLE 2-continued

Connotative Database Fields

| | | |
|---|---|---|
| 33 Torment | 15 Remorse | 33 Rancor |
| 34 Unhappiness | 16 Shame | 34 Resentment |
| 35 Wretchedness | 17 Stigma | 35 Vexation |
| 36 Yearning | | 36 Virulence |
| | | 37 Wrath |

In an embodiment including a set of human interest fields 48, the fields 48 relate a record and its denotative context to a human interest category. The purpose of incorporating the human interest fields is to permit the end user to easily retrieve special connotative content from the database by first selecting one or more human interest filters before querying the database. The human interest fields employed in a preferred embodiment of the invention are listed in Table 3. There are nine groupings of the human interest categories in such embodiment. Each human interest category is a field having a descriptor word. The categories and descriptors may vary from embodiment to embodiment.

TABLE 3

SET 3: Human Interest Database Fields

| Non-emotional Connotations | Perception |
|---|---|
| Power | Abstract/Concrete Continuum |
| Activity | Place, General |
| Rhythm | Place, Event |
| | |
| Number of Syllables | Place, Transportation |
| Accented Syllable | Place, Cosmos |
| Special Diction | Place, Noted |
| | |
| Question-starting Words | Color |
| Core Words Identified by S. I. | Hearing |
| Hayakawa | Touch |
| Personal Identity | Taste |
| | |
| Gender | Smell |
| First Names (Baby Names) | Time, General |
| Notorious Or Celebrated People | Time, Historical |
| Languages | Time, Calendar |
| National Identity | Non-medical Drug Use |
| Organizations of Note | Non-human Life |
| | |
| Home | Animals |
| Personal Relationships | Plants |
| Intimacy | Micro Organisms |
| Spiritual Identity | Argot/Vernacular |
| | |
| Biblical Diction | Slang |
| Christianity | Taboo |
| Judaism | Offensive |
| Islam | Derogatory |
| Hinduism | Disgusting/Revolting |
| Buddhism | Euphemistic |
| Other Religious | Cliche |
| Myth and Legend | |
| Paranormal | |
| Physical Identity | |
| Physical Appearance | |
| Body | |
| Health | |

In a preferred embodiment of the invention, the assignment of the fields and records as described above effectively links each traditional dictionary definition of each term in each context with more than 200 connotative and human interest variables. The data base may be organized into one or more tables, files or other units of organizing data. Regardless of the number of tables or files, there are entries from each table or file which correspond to a term (i.e., a word or phrase among the denotative fields). The data associated with any given term is referred to herein and in the claims as a 'record', whether or not coming from a single table or file, or from multiple tables or files. Each record includes a field which identifies a term and another field which identifies the denotative context for the term. The record also includes a field which identifies the connotative meaning. Thus, each record includes at least three fields allocated among 1 to 3 tables, files or other units of organization of the data base. In a preferred embodiment there are a plurality of connotative meaning fields, at least one for each of a plurality of emotional categories. The connotative meaning fields identify an emotional descriptor for a corresponding emotional category. Such identification may be an identification of a specific emotional descriptor within the corresponding category or an indication that there is no emotional descriptor for such category. An indication of no connotative meaning is still considered to be connotative meaning information.

In varying embodiments additional fields are included for any one or more of the following types of information: parts of speech, intensity of connotative meaning, power rating, activity rating, abstract/concrete rating, human interest areas. When an intensity field is included the intensity is an intensity of a connotative meaning and is associated with a corresponding emotional category and the identified emotional descriptor for such category.

User Interface 14:

In a preferred embodiment a graphical user interface is implemented, which provides an end user with the capability of retrieving connotative synonyms from the data base 12. Although there are many ways in which a user interface may be implemented, in one embodiment a system with menus and windows is used.

Figure 3:
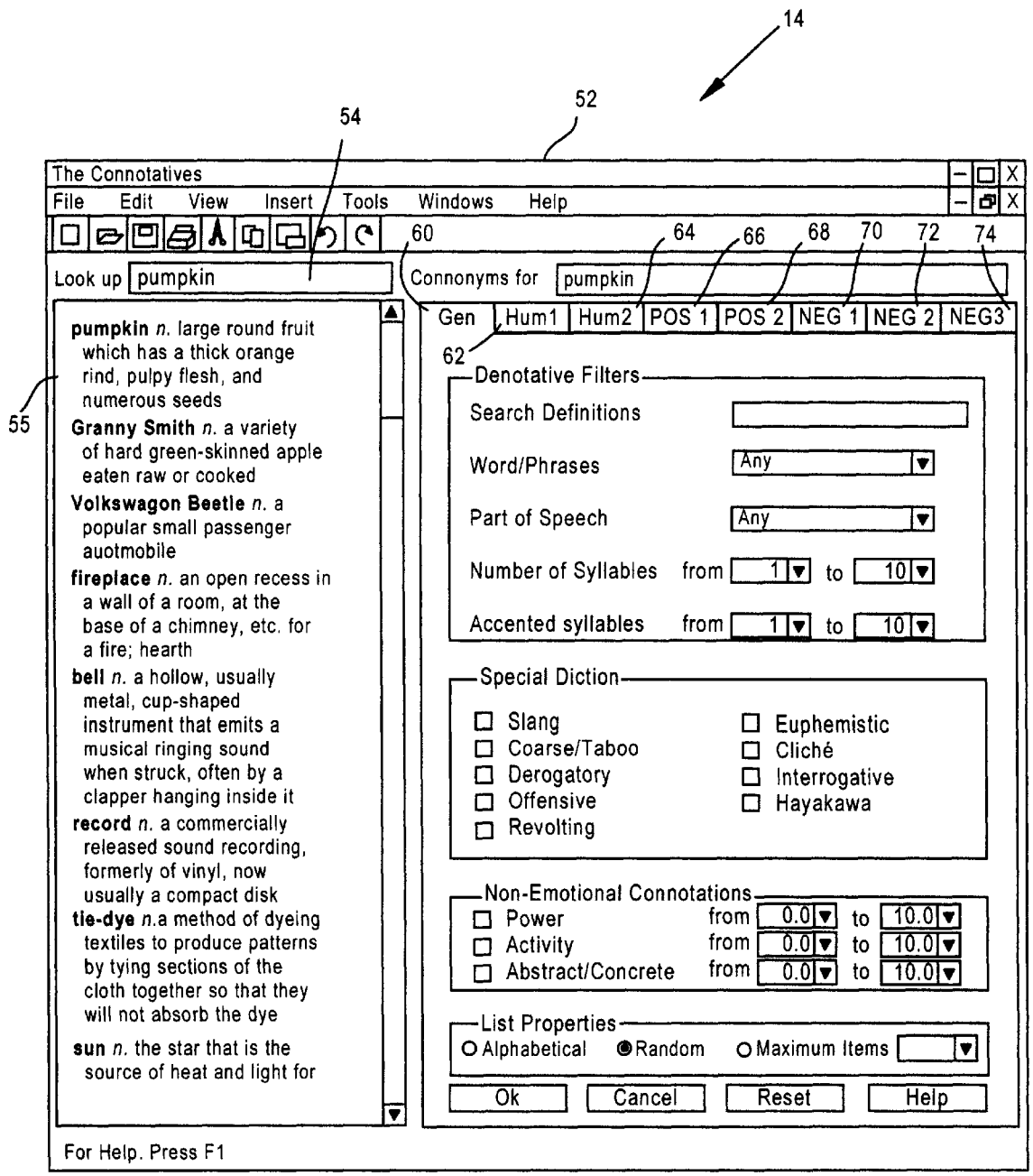
FIG. 3 is a display sample of a user interface according to an embodiment of this invention.
Figure 4:
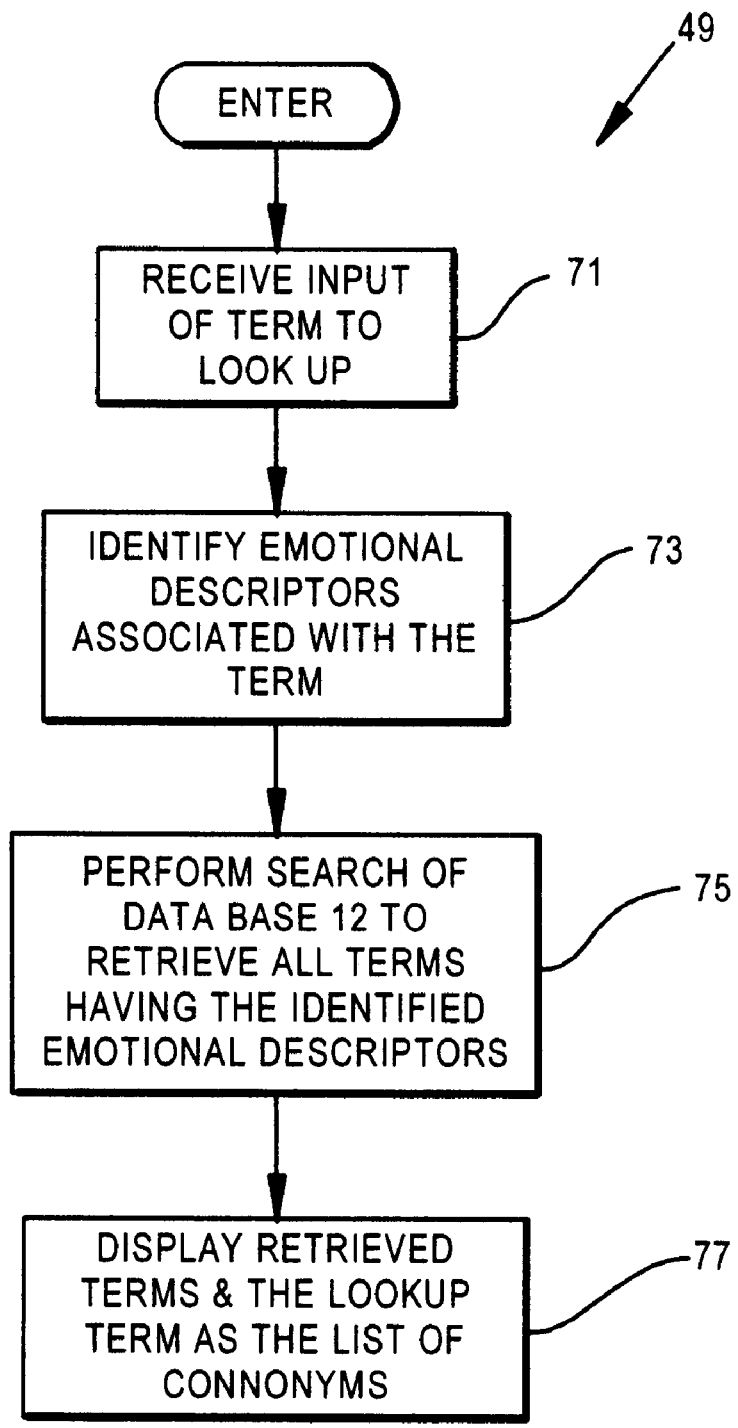
FIG. 4 is a flow chart of a process for looking up connonyms from the data base of FIG. 2.

FIG. 3 shows an embodiment of a graphical user interface 14 used for retrieving connonyms. A window 52 is presented to the user. The user enters a word or phrase (i.e., a term) in a look-up box 54. Connotative synonyms then are retrieved from the database 12 and displayed to the user along with the look-ed term in window area 55. Once a user enters the term to be looked up (i.e., evaluated), a retrieval process 49 as shown in FIG. 4 (one of the filtration and retrieval processes 16) is executed. At one step 71 the term is received and looked up in the data base 12. At another step 73 the emotional descriptors (e.g., the corresponding codes stored in the data base 12) for such looked up term are identified. At another step 75, a search is performed of the data base 12 for all terms which have the same emotional descriptors (e.g., terms which include at least the same codes). At step 77 any terms which have at least the same emotional descriptors as the looked up term are displayed in an area 55 of the window 52. In one embodiment the identified terms and their denotative data is displayed in the window area 55.

Figure 5:
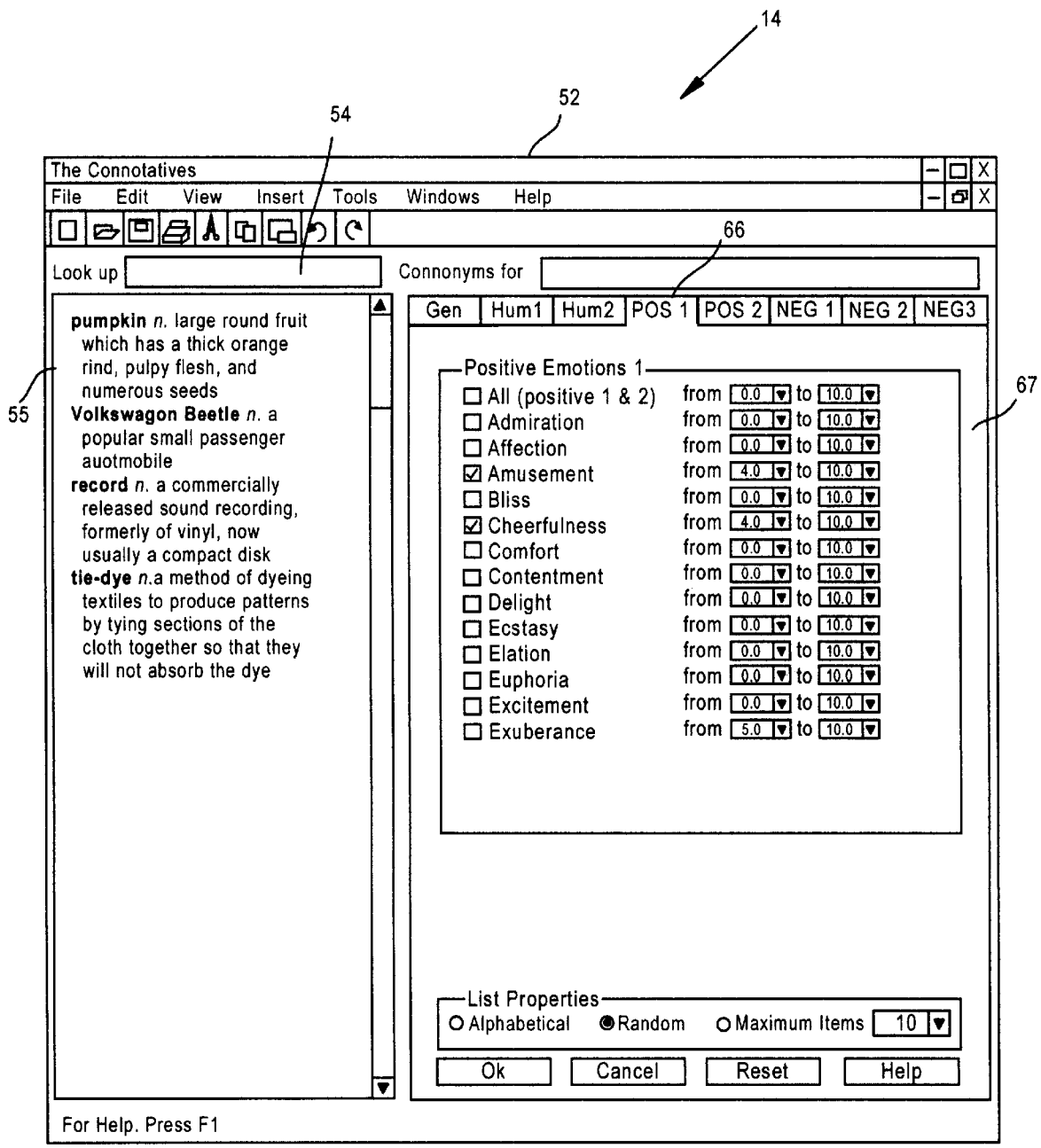
FIG. 5 is another display sample of the user interface according to an embodiment of this invention.

In another area 57 there are overlapping window portions and corresponding tabs 60, 62, 64, 66, 68, 70, 72 and 74. A user can inspect the common connotative meanings by pressing on one or more of the tabs for the emotional categories (e.g., tabs 66, 68, 70, 72, 74). In the embodiment illustrated there are two tabs 66, 68 for the emotional descriptors within the positive emotional categories and three tabs for the emotional descriptors within the negative emotional categories. FIG. 5 shows the window area 67 corresponding to one of the tabs 66 for the emotional descriptors within the positive emotional categories. There are two common connotative meanings displayed in area 67 that are shared by the identified terms—'amusement' and 'cheerfulness'. Additional descriptors in common may be identified by pressing one of the other tabs 68, 70, 72 and 74 and looking to see which emotional descriptors are checked off as being in common for the terms listed in area 55.

Another retrieval process also may be executed to refine the list of connonyms. Referring to FIG. 5, a user may select an intensity range for one or more of the emotional descriptors listed in area 67. By selecting a range of intensity for one or more of the common emotional descriptors, the list of identified terms in area 55 is narrowed down to identify only those terms which also meet the intensity criteria. Comparing FIGS. 3 and 5, one can see that the list of terms in area 55 is shorted in FIG. 5, because an intensity range of 4–10 is selected for 'amusement' and for 'cheerfulness'. Although the same intensity range is identified, the same or a different intensity range may be selected for any emotional descriptor. The terms displayed in FIG. 5 have a stronger underlying emotional tie to the looked-up term than the omitted terms from FIG. 3.

In a preferred embodiment, the user may select any number of emotional descriptors from the lists revealed by clicking the various tabs that provide access to the emotional descriptor lists. The number of different connonym lists that may theoretically be generated using a preferred system and apparatus for practicing the invention is a function of the combination of the number of descriptors available and the number of descriptors selected. See the following combination formula:

$$nCr = n!/(n-r)!r!$$

where n is the number of descriptors available (in a single list or in a combination of lists, as the case may be), and r is the number of descriptors selected. Even though such numbers run into hundreds of thousands of possible connonym lists with only a few descriptors selected, the actual numbers are much higher, because the user may also select particular ranges of intensity associated with any emotional descriptor, thus removing any practical limits on descriptor identity. In FIG. 2, for example, the user has selected "Cheerfulness" at an intensity level of between 4 and 10 on a 10-point scale, and "Amusement," also at an intensity level of between 4 and 10. If the user had selected a different range of intensity for either of the two emotional descriptors, without de-selecting either descriptor, and without adding any others, then the list of connonyms retrieved by the system and apparatus would have been different than the four connonyms that appear in the example illustrated in FIG. 5.

Figure 6:
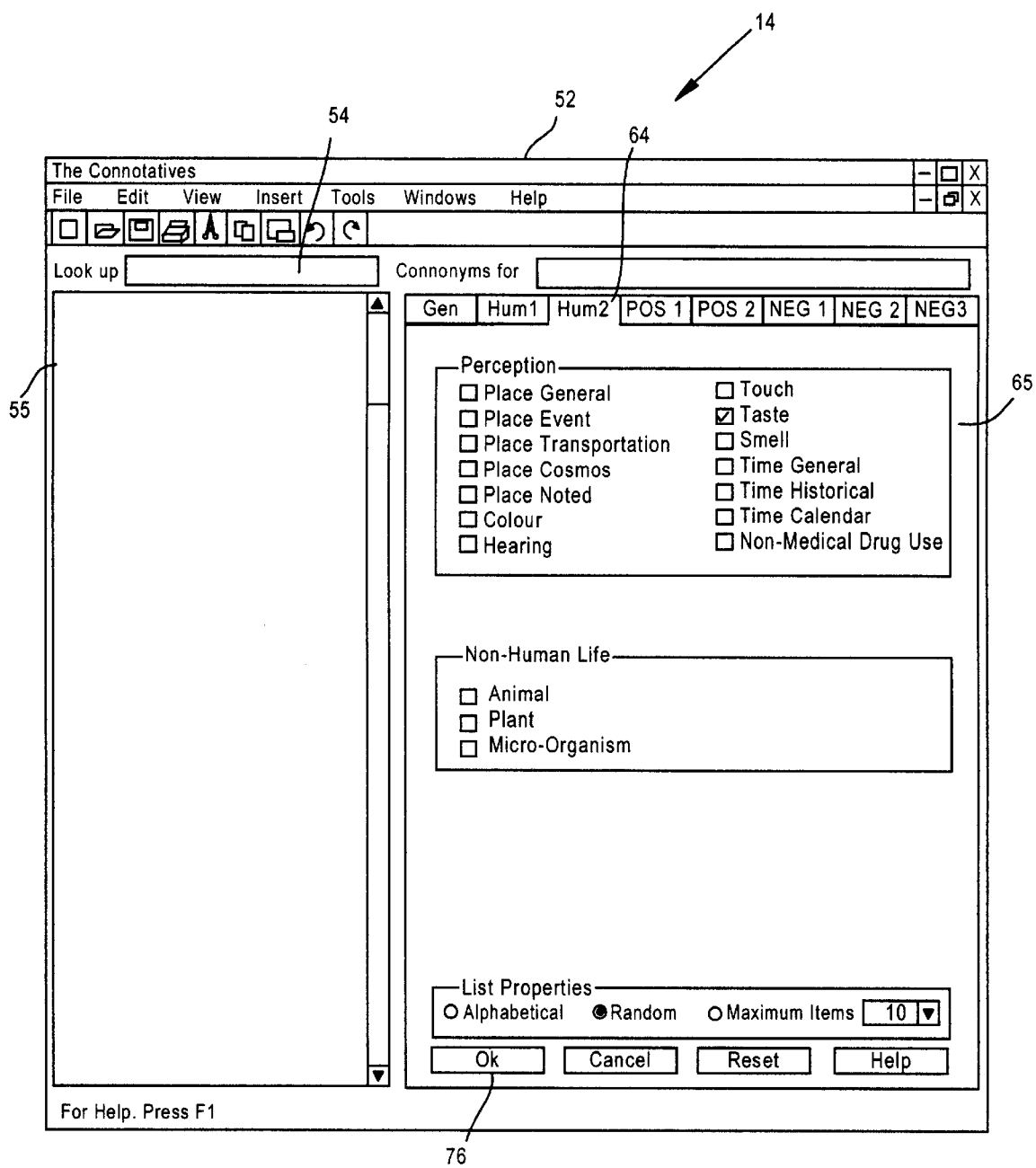
FIG. 6 is a display sample of the user interface showing human interest filters for selecting terms to retrieve from the data base.
Figure 7:
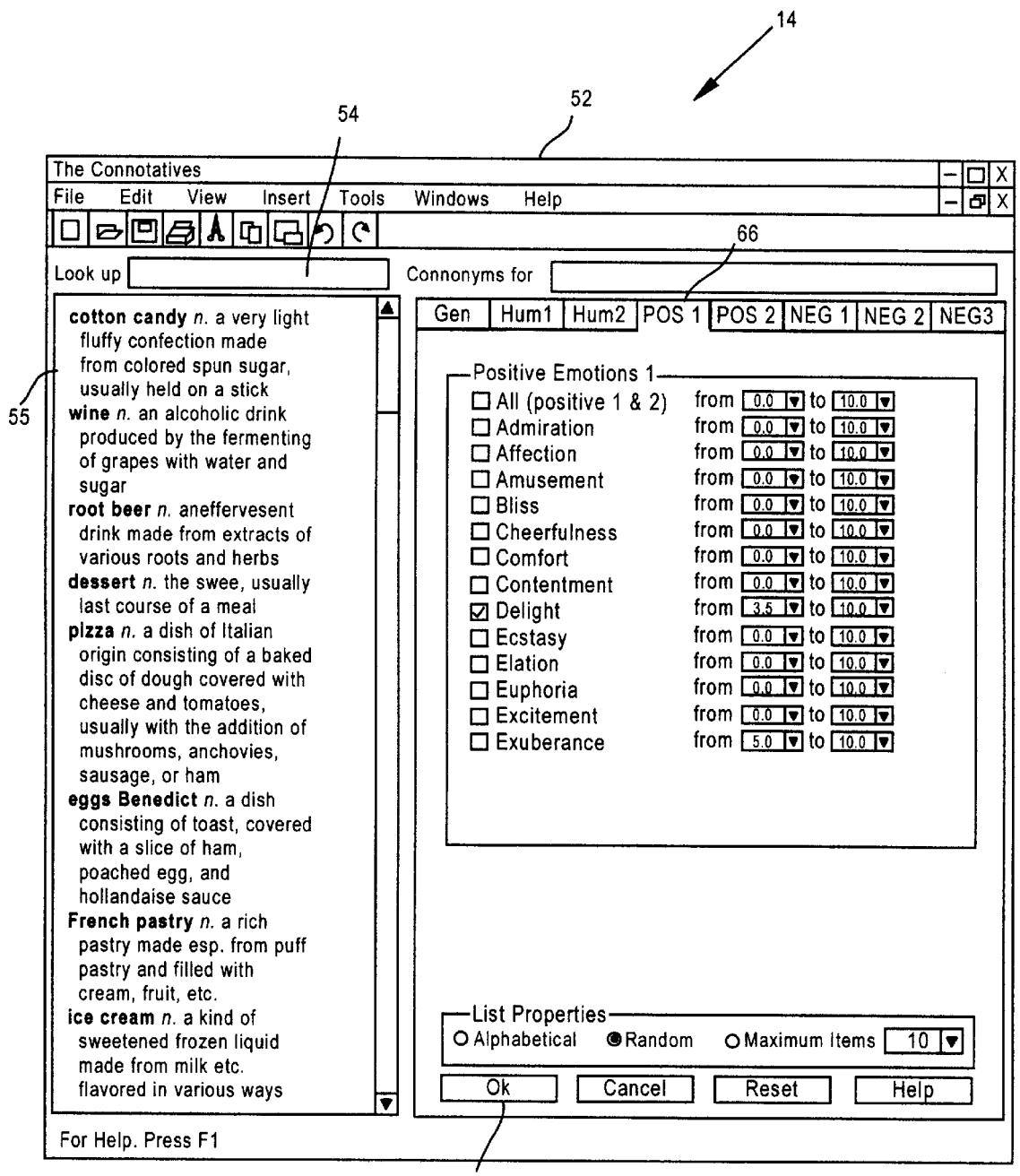
FIG. 7 is another display sample of the user interface according to an embodiment of this invention.

In some embodiments there is another way of identifying connonyms. The first way described above is to enter a term in a look up box 54 of the window 52. Another way is to go through the tabs 60–74 and select criteria. In addition to the tabs 66–74 for the emotional descriptors, there also are tabs 60–66 for various filters. Referring to FIGS. 3 and 6 the window areas 61 and 65 are shown with sets of filters. These filters correspond to the human interest areas of Table 3. In addition, there are some general denotative filters included in FIG. 3. A user simply checks off an area of human interest or enters data into one of the denotative filters or non-emotional connotation filters. All terms in the data base corresponding to the checked off or otherwise selected criteria are then displayed in area 55. Referring to FIG. 6 the filter for 'taste' is selected. The user then clicks on the 'OK' button 76 to display all terms in the database associated with 'taste'. A additional criteria or alternative criteria may be entered. Referring to FIG. 7, the query is refined by selecting an emotional descriptor. In this example, the user has selected 'delight' and also has selected an intensity range of 3.5 to 10. Once the 'OK' button is pressed, the terms associated with 'delight' and 'taste' are displayed in area 55.

Figure 8:
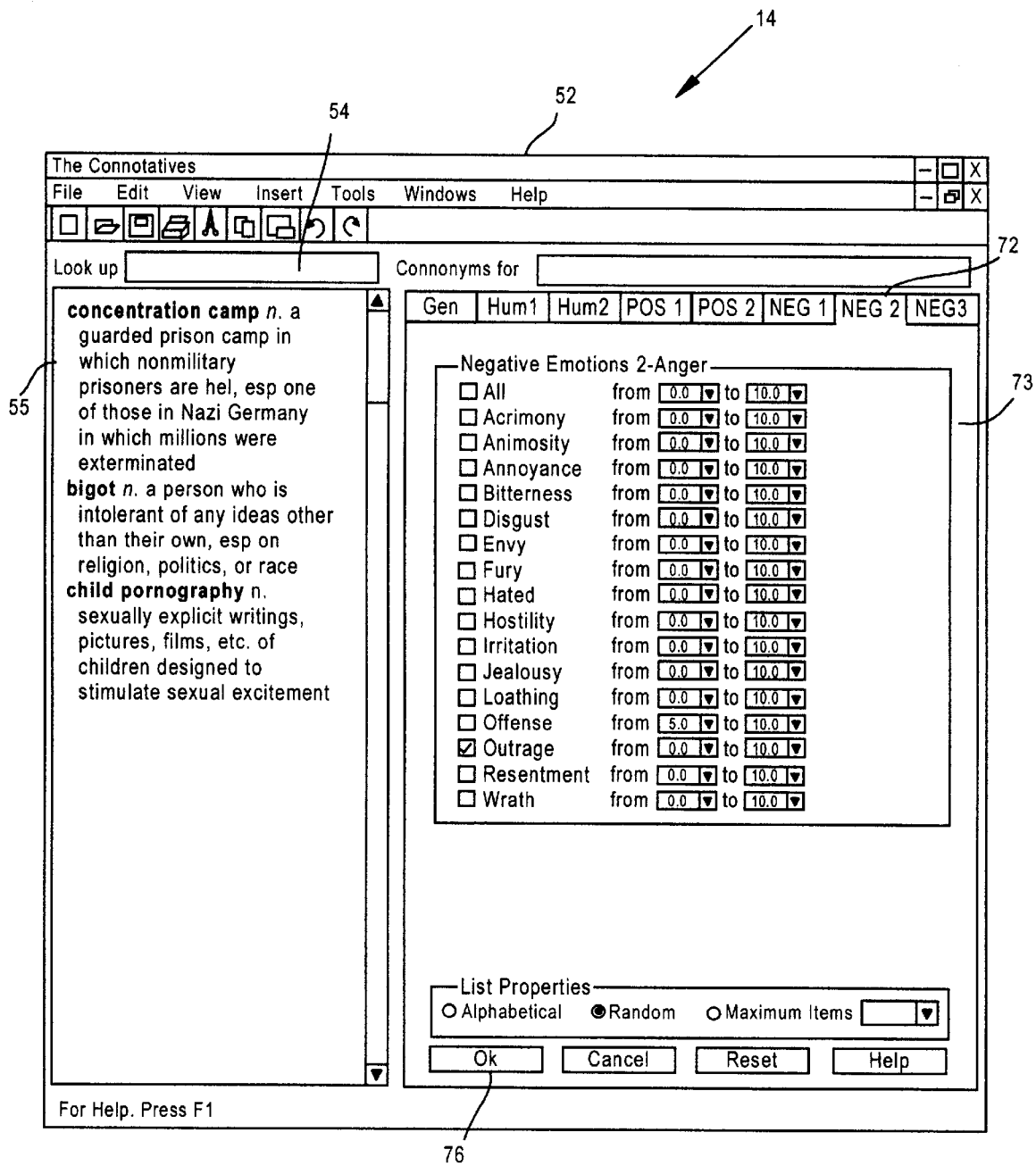
FIG. 8 is yet another display sample of the user interface according to an embodiment of this invention.

Referring to FIG. 8, in another search a user has selected a tab 72 relating to negative emotions. Window area 73 lists some of the emotional descriptors for such negative emotions. In this example, the user has selected the descriptor 'outrage' and an intensity rating of 5.0 to 10.0. Once the 'OK' button 76 is pressed, a process is executed to retrieve all terms in the data base 12 which having an entry among the connotative fields 46 for outrage and a corresponding intensity that is between 5.0 and 10.0. In this example, three terms have been identified and displayed in the area 55.

In a best mode embodiment the data base 12 is stored on a computer readable storage media, such as embedded memory, RAM, ROM, a hard disk, an optical disk, a floppy disk, magneto-optical disk, electro-optical disk, or another known or to be implemented transportable or non-transportable computer readable storage media. The user interface 14, processing filters and other executable instruction code 16 for maintaining and accessing the data base also is stored on the same or another computer readable storage media of the types listed above.

Under various computing models, the connotative language reference is installed at an end user computer or accessed remotely from an end user computer. For resident computing models, the executable instructions may be loaded onto the computer and the data base accessed from a transportable storage media. Alternatively the data base also may be installed locally. One skilled in the art will appreciate the many computing configurations that may be implemented. For non-resident computing models, the data base may be stored at a server computer on a public or private, local or wide area network, or even on a global computer network. The executable instructions may be run either at the end user computer or at a server computer with the data being displayed at the end user's display device.

Identifying Connotative Meaning

According to a preferred embodiment the connotative meanings associated with a word or phrase found in the connotative thesaurus are derived by subjective responses from a plurality of evaluators. In a best mode embodiment the evaluators are a panel of persons having objective credentials or accepted expertise in connotative analysis. However, in some embodiments the evaluators may be selected at random. Such persons are referred to herein as connotative judges. In a preferred embodiment, the Internet is used as a recruitment medium to recruit 100 to 200 individuals who are not known to each other to act as independent connotative judges. In one embodiment, the connotative judges are screened for the following characteristics listed below in Table 4:

TABLE 4

Characteristics and Qualifications of Connotative Judges 1. 25% of all judges aged 40 or older and female
2. 25% of all judges under the age of 40 and female
3. 25% of all judges aged 40 or older and male
4. 25% of all judges under the age of 40 and male
5. All judges having at least 2 years of post-secondary education
6. All judges having an above-average vocabulary and command of whichever language is being used to practice the invention.
7. All judges having a substantial interest and some experience in the craft of writing, preferably creative writing.

TABLE 4-continued

Characteristics and Qualifications of Connotative Judges

8. Judges geographically dispersed over the area of interest for the language of interest.

While the above qualifications are used in one embodiment, the invention may be practiced using any number of judges having any qualifications of one's choosing. For example, connotative judges may be only women, or only men, or only individuals of a defined age or ethnic group, or only people who reside in a certain geographical location. The nature and quality of data captured will of course vary with the demographic profile of connotative judges, as well as with the number of judges used when practicing the invention, their geographical locations, and the linguistic qualifications of the judges.

The connotative judges evaluate the meaning of given words and phrases for connotative content using a questionnaire. The questionnaires preferably are distributed as database software files, although they may also be distributed in paper document form. The responses of the connotative judges are processed using either custom-designed database software or database software commercially available from manufacturers such as Inprise, Oracle, and Microsoft. As the data are analyzed, a database of connotative meaning is constructed, which is linked with each context of each word in the connotative thesaurus. Each questionnaire is, in effect, a small database table containing four data fields, preferably five data fields, as summarized in Table 5.

TABLE 5

Data Fields for Questionnaire Tables to Capture Connotative Data

| | |
|---|---|
| Field 1 | A field containing a term selected at random from the term field of the main database |
| Field 2 | A field containing the denotative context for the term in Field 1 |
| Field 3 | A field containing the part of speech for the term in Field 1 (optional, but preferred) |
| Field 4 | A blank field assigned for the connotative judge to record data identifying emotional connotations associated with the term and context in Fields 1 and 2 |
| Field 5 | A blank field assigned for the connotative judge to record data corresponding to intensity of emotion associated with the term, context and part of speech in Fields 1, 2 and 3 |

Field 4 is used for identifying connotational meaning. Field 5 is used for identifying the intensity of the connotation. The use of Field 5 is described below in the section, Quantifying Intensity of Connotative Meanings.

In one embodiment, a distributed computing model is employed, in which the connotative judges use their own computers in their own homes or offices to receive questionnaire tables over the Internet (via e-mail or from a World Wide Web site) that are extracted from the main database 12. The connotative judges complete their work on the questionnaire tables, and then return the data tables over the Internet.

Figure 9:
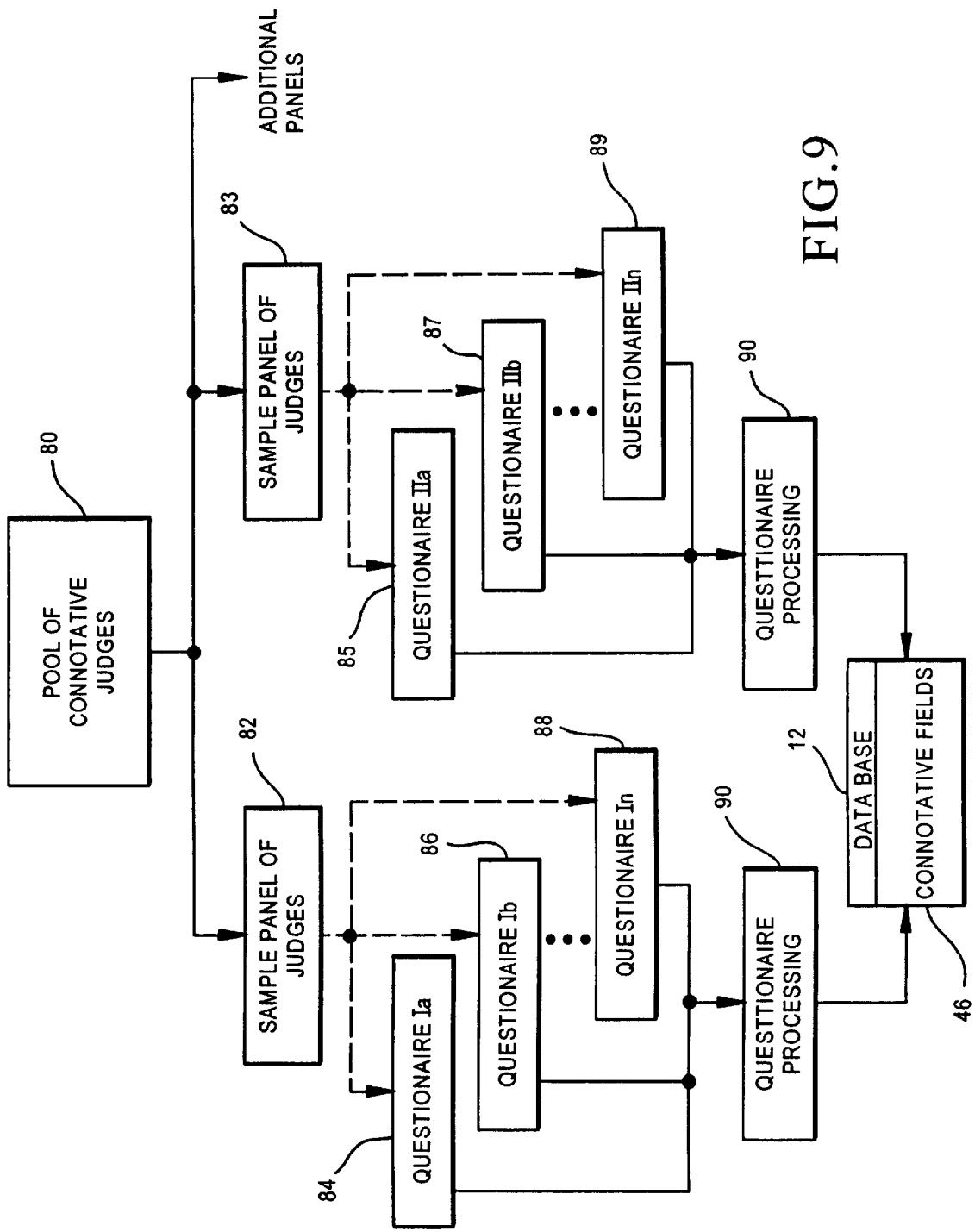
FIG. 9 is a diagram of a system for identifying connotative meanings according to an embodiment of this invention.

Referring to FIG. 9, a pool 80 of connotative judges are recruited to evaluate records of the connotative data base 12 for connotative associations of corresponding words and phrases. A sample of judges from the pool 80 forms a panel 82 used to evaluate a set of records. The same or different panels are formed to evaluate other sets of records. The number of records in a set may vary. For purposes of illustration a panel of 24 judges is described which evaluates a set of 500 records. In a preferred embodiment, each judge typically receives a questionnaire table 84 covering approximately 500 records, each record consisting of the four fields identified in Table 4. The questionnaire laso includes instructions for selecting a code number to fill in the blank Field 4 for each record. Each connotative judge is also supplied with one or more of the eight category lists of code-numbered emotional descriptors identified in Table 2. In a preferred embodiment for a given questionnaire each judge is supplied with only one of the eight category lists of emotional descriptors found in Table 2. Thus, in a given questionnaire a judge evaluates the terms for connotative meaning in only a specific emotional category. To complete the questionnaire table, the connotative judge inputs one of three codes or code types for each record in Field 4, as listed in Table 6.

TABLE 6

Coding Alternatives for Capturing SET 2 Connotative Data

1. Code the two-digit number (see Table 2 above) associated with one and only one emotional descriptor that most closely matches the emotional connotation that the connotative judge associates with the word or phrase, considering the denotative context and part of speech.
2. Code "00" if the connotative judge understands the word or phrase and its denotative context, but does not associate any of the emotional descriptors from the supplied list of emotional descriptors with the word or phrase and its denotative context.
3. Code "99" if the connotative judge does not know the word or phrase, or the specific associated denotative context.

In a preferred method of practicing the invention, only one judgment is required for each record in a questionnaire table. However, in other embodiments more than one judgment may be allowed or required, if, for example, one wishes to capture the connotative judge's first choice and also the connotative judge's second choice of emotional descriptor. To effect such data capture, the number of connotative fields 46 (see FIG. 2) would need to be expanded accordingly, and the questionnaire table structure modified to include additional data capture fields.

The connotative judge repeats this procedure for all 500 records in the questionnaire, then returns the completed questionnaire table 84 via the Internet. Thereafter, the judge may receive another questionnaire table 86, or 88 to evaluate. The next questionnaire table received by the connotative judge may contain exactly the same set of records that was just evaluated, but accompanied by a different category list of emotional descriptors to be used for coding. Alternatively, the next questionnaire table may contain a completely different selection of records. The exchange of questionnaire tables continues iteratively for the duration of connotative data collection.

In a preferred embodiment of the invention, each block of 500 records is evaluated in this manner eight times (corresponding to the eight category lists of connotative descriptors listed in Table 2), each time by 24 different connotative judges selected at random from the pool of 100 to 200 available connotative judges, using a judge-selection technique that stratifies sampling to ensure equal representation according to the guidelines summarized in Table 4. Note that the number of judges selected, the size of the pool and the number of records processed in a given questionnaire may vary.

Typically a plurality of panels 82, 83 are formed to evaluate the database 12 records for connotative associations. Different panels 82, 83 receive either the same or different questionnaires 84–89. For the exemplary embodiment where 24 judges evaluate each of 500 records in a given questionnaire, the same 24 judges may or may not evaluate all eight categories of emotional connotations for such 500 records.

Quantifying Intensity of Connotative Meanings

As previously described each judge receives a questionnaire. In one embodiment the questionnaire is in table format. Each record in the table has multiple fields as listed above in Table 5. Fields 1, 2 and 3 are already complete and correspond to the term, a denotative context for such term, and a part of speech. Field 4 is filled in as described above to identify connotative meaning for the term. Field 5 is to be filled in to record the intensity associated with the connotative meaning provided in Field 4. When a judge indicates that there is no connotative meaning for the term or that the judge does not know the term, or the specific denotative context, then there is no need to quantify an intensity in Field 5. Where a judge is permitted to provide two connotative meanings (e.g., a primary and a secondary connotative meaning) then additional fields are included for each record in the questionnaire (e.g., two corresponding to Field 4 and two corresponding to Field 5).

Typically a judge quantifies the intensity of the connotative meaning when selecting the connotative meaning itself. The intensity is a scaled value judgement of the judge. Table 7 lists the ratings scale for one embodiment.

TABLE 7

General Coding Model for Capturing Field 5 Data

| 1 | 2 | 3 | 4 | 5 | 6 | 7 |
|---|---|---|---|---|---|---|
| slightly intense | | | | | | very intense |

0 = automatically coded, corresponding to '00' code entry in Field 4
9 = automatically coded, corresponding to '99' code entry in Field 4

In a preferred embodiment, a guiding set of anchor terms are included which are prerated for intensity. The judge's review of such guiding set improves consistency and accuracy among many judges completing the questionnaires. Specifically, the anchor terms are terms that are associated with scale numbers that represent the average intensity scores that other people have provided for various terms. Each connotative judge is expected to disagree with some of the scores represented by some of the anchor terms. For this reason, connotative judges are instructed to either, (i) highlight only those anchor terms with which they are comfortable, or (ii) alternatively, cross out those anchor terms with which they are uncomfortable. The connotative judge then compares the term he or she is scaling in the questionnaire table with his or her intensity of feeling associated with the anchored scales, choosing the scale number with the closest match.

The anchor terms are representative averages; they do not imply "correctness," but rather provide the connotative judge with indicators of the relative strength of feeling that the connotative judge associates with the chosen emotional descriptor that is meant to be associated with each score number. In effect the anchor terms serve as a way for the judges to calibrate themselves to a scale of intensity. Table 8 presents a typical list of anchor terms associated with a group of emotional descriptors subsumed under the emotional category 'Sadness,' which is one of the eight emotional categories previously described.

TABLE 8

Anchor Terms for Scaling Intensity of Connotative Feeling
for the Emotional Category "Sadness"
(NOTE: the numbers 1 through 12 for the anchor words
are merely for reference purposes. NO RANK ORDER is
implied by the numbering within a scale level.)

SCALE LEVEL 7 (very intense sadness)

1. Holocaust - n the mass murder by the Nazis of the Jews of continental Europe between 1940 and 1945.
2. Auschwitz - n Polish town, site of a Nazi death camp during World War II.
3. child abuse - n physical, sexual, or emotional ill-treatment or neglect of a child by parents or other adults.
4. AIDS - n acquired immune (or immuno-) deficiency syndrome.
5. rape victim - n a person who has suffered rape/sexual attack
6. starving person - n a person whose health is deteriorating from lack of food
7. murder - n the unlawful premeditated killing of one human being by another
8. cancer - n malignant growth or tumor; uncontrolled cell division
9. suicide - n the act or an instance of killing oneself intentionally
10. death - n the permanent end of all functions of life
11. blind - adj unable to see; sightless
12. insane - adj mentally deranged; crazy; of unsound mind

SCALE LEVEL 6

1. slave - n a person having no freedom and forced to work for another.
2. abused person - n a person who is maltreated, esp. physically or sexually.
3. leukemia - n an acute or chronic disease characterized by a gross proliferation of leucocytes; cancer of the blood.
4. abandon - v to forsake completely; desert; leave behind
5. child pornography - n sexually explicit writings, pictures, films, etc., of children designed to stimulate sexual excitement.
6. depression - n a mental disorder characterized by extreme gloom, feelings of inadequacy, and inability to concentrate
7. divorce - n the dissolution of a marriage by judgment of a court.
8. starve - v to die or cause to die from lack of food.
9. lonely - adj unhappy as a result of being without the companionship of others
10. heartless - adj unkind or cruel; hard-hearted
11. hurt - adj injured or pained physically or emotionally
12. suicidal - adj involving, indicating, or tending towards suicide

SCALE LEVEL 5

1. beggar - n a person who begs, esp. one who lives by begging.
2. sufferer - n a person who is undergoing pain, punishment, etc.
3. leper - n a person who has leprosy.
4. victimize - v to punish or discriminate against selectively or unfairly.
5. lose - v to be without, as through theft, accident, negligence, etc.
6. degrade - v to reduce in worth, character, etc.; disgrace; dishonor.
7. desert - v to leave or abandon, esp. in violation of a duty, promise.
8. deprive - v to prevent from possessing or enjoying; dispossess (of).
9. alienate - v to cause to become indifferent, unfriendly, or hostile; estrange.
10. demoralize - v to undermine the morale of; dishearten.
11. pain - n emotional, mental, or physical suffering or distress.
12. missing - adj not able to be traced and not known to be dead.

SCALE LEVEL 4

1. inmate - n a person confined to an institution such as a prison or hospital.
2. drunkard - n a person who is frequently or habitually drunk.
3. addict - n a person who is addicted, esp. to narcotic drugs.
4. haunt - v to intrude upon or recur to (the memory, thoughts, etc.)
5. condemn - v to express strong disapproval of; censure.
6. refuse - v to decline to accept (something offered).
7. skid row - n a dilapidated section of a city inhabited by vagrants, etc.

TABLE 8-continued

Anchor Terms for Scaling Intensity of Connotative Feeling
for the Emotional Category "Sadness"
(NOTE: the numbers 1 through 12 for the anchor words
are merely for reference purposes. NO RANK ORDER is
implied by the numbering within a scale level.)

8. hopeless - adj having or offering no hope.
9. alone - adj apart from another or others; solitary.
10. persecuted - adj oppressed, harassed, or maltreated.
11. unemployed - adj without remunerative employment; out of work.
12. deformed - adj disfigured or misshapen.

SCALE LEVEL 3

1. wino - n a person who habitually drinks wine as a means of getting drunk.
2. wretch - n a person pitied for their misfortune.
3. tracks - n needle marks on the skin of an injection drug user.
4. ostracize - v to exclude or banish (a person) from a particular group, society.
5. forsake - v to give up (something valued or enjoyed).
6. jail - n a place for the confinement of prisoners.
7. lonely - adj unhappy as a result of being without companionship of others.
8. hungry - adj experiencing pain, weakness, or nausea through lack of food.
9. rejected - adj not accepted, acknowledged, used, believed, etc.
10. pitiful - adj arousing or deserving sympathy or sorrow.
11. helpless - adj unable to manage independently.
12. let down - adj unfulfilled in expectations; disappointed.

SCALE LEVEL 2

1. drop-out - n a student who fails to complete a school or college course.
2. lush - n a heavy drinker, esp. an alcoholic.
3. underestimate - v to think insufficiently highly of.
4. flophouse - n a cheap lodging house, esp. one used by tramps.
5. God Bless the Child - n a song written by Billie Holiday and Arthur Herzog.
6. homesick - adj depressed or melancholy at being away from home and family.
7. lost - adj confused, bewildered, or helpless.
8. empty - adj without purpose, substance, or value.
9. heavy hearted - adj sad; melancholy.
10. disenchanted - adj disillusioned.
11. unlucky - adj characterized by misfortune or failure.
12. blue - adj depressed, moody, or unhappy.

SCALE LEVEL 1 (slight sadness)

1. wallflower - n a person who stays on the fringes of a dance or party.
2. gambler - n a person who risks or bets (money) on games, sports, etc.
3. orphan - n a child, one or (more commonly) both of whose parents are dead.
4. runaway - n a person who takes flight or escapes.
5. dim - v to cause to seem less bright, as by comparison.
6. coal mine - n a system of excavations made for the extraction of coal.
7. mobile home - n living quarters mounted on wheels and capable of being towed.
8. Monday - n the second day of the week; first day of the working week.
9. comb-over - n a hairstyle in which long hair from the fringes of the scalp is arranged to cover and hide a bald portion of the scalp.
10. colorless - adj grey or pallid in tone or hue.
11. indifferent - adj showing no care or concern; uninterested.
12. resigned - adj acquiescent or submissive.

A judge looks at each anchor term for a given rating in a given emotional category of the categories listed in Table 2. The judge selects one or more anchor terms under a given rating for a given emotional category which the judge feels most closely relates to the intensity rating subjectively felt by the judge.

In a preferred embodiment, the anchor terms are updated over time based upon many judges' response entries into Field 5 for each record. In particular the Field 4 and 5 entries are analyzed to identify terms which consistently are judged by many different judges to have the same connotative meaning and the same intensity. Such terms become reliable anchor terms. This is done on an ongoing basis in order to build up a large, reliable database of anchor terms.

As indicated above, an 8-point scale (including zero, indicating absence of the specified connotative feeling) is used to capture data for Field 5 in a preferred embodiment of the invention. However anchored scales of smaller or larger size, such a 3, 5, or 9 point scales may be used. Also, the number of anchor words or phrases may be greater than the 12 used in the preferred method, or fewer than 12. The number of anchor terms should be large enough to allow a choice permitting the connotative judge to select only those with which he or she is comfortable.

The connotative judge repeats the above steps to input data for Fields 4 and 5 for all records in the questionnaire, then returns the completed questionnaire table via the Internet, then receives another questionnaire table to evaluate. The next questionnaire table received by the connotative judge may contain exactly the same set of terms that was just evaluated, but accompanied by a different list of emotional descriptors to be used for coding Field 4, and a correspondingly different set of anchors for coding Field 5. Alternatively, the next questionnaire table may contain a completely different selection of terms, with a corresponding emotional descriptor list for Field 4 and an anchor term list for Field 5. The exchange of questionnaire tables continues iteratively for the duration of connotative data collection.

In a preferred embodiment of the invention, each block of 500 records is evaluated in this manner eight times, corresponding to eight emotional categories, each time by 24 different connotative judges. In this manner, a full-language database in any language, associating every context of every word with a very broad range of identified emotional connotations and their individual intensity levels, is constructed.

Data Integrity

Comparatively analyzing the connotative data associated with each block of records being processed serves to check for data integrity. Checking the data for integrity is part of an automated questionnaire processing function 90 (see FIG. 8). An initial integrity processing step is to determine whether any of the 24 sets of data should be rejected as invalid because of anomalous data. This is accomplished by statistically comparing the score set of each individual judge with the combined score sets of the other 23 judges who evaluated the same set of words using the same lists of emotional descriptors. If the scores between any given judge's data and the aggregate data of the other judges in the panel are not statistically related, then the data set for the anomalous judge is rejected. Anomalous data may arise if, for example, a connotative judge is filling in random data to avoid the mental work involved in providing genuine connotative data, or if a judge is coding a large number of double zeros and ninety-nines, or if a judge's experience is so far out of the mainstream that his or her connotative associations are not representative of the larger population. In a preferred method of practicing the invention, a minimum correlation level of 0.6 is used as a data rejection threshold.

For further analysis, it is necessary to determine how many valid non-zero scores remain after purging invalid scores and after accounting for 00 and 99 scores.

A determination is then made to ascertain which emotional connotations the judges most often associate with each word or phrase. This is a function of four factors:

1. The number of valid scores remaining after data purging;
2. The number of emotional connotative descriptors in the list the judges had to choose from;
3. The number of judges who selected the same emotional descriptor; and
4. The probability that the same emotional descriptor was selected by more than one judge merely by chance.

The multinomial probability distribution below in equation (I) embodies the above factors:

$$P(y) = \frac{n!}{y!(n-y)!} * p^y q^{n-y} \quad (I)$$

where:

n is the total number of independent connotative judges evaluating the record;

y is the number of judges selecting a particular emotional descriptor;

p is the probability of the emotional descriptor being selected if the selection occurs by chance;

q is the probability of an emotional descriptor being excluded if the selection occurs by chance; and P(y) is the probability of the emotional descriptor being selected by y judges if the selections occurred by chance.

Tables may be constructed of the probabilities P(y) of connotative judges independently selecting the same emotional descriptors by chance for various panel sizes (e.g., increasing incrementally up to 24, and/or additional panel sizes of 36, 72, 96, 120 or any other panel size), and emotional connotative descriptors available for selection (e.g., increasing incrementally up to 24, with additional category group sizes of 36, 72, 96, 120 or any other corresponding group size).

As an example, consider the following set of connotative judgments for one word evaluated by 24 connotative judges on the Amusement/Excitement emotional category, which subsumes 16 emotional descriptors. The total number of valid judgments after purging is 21 (Table 9).

TABLE 9

Example of Field 4 and 5 Questionnaire Table Scores

| Emotional Descriptors | Field 4 "Votes" Received from Connotative Judges | Field 5 Intensity Scores |
|---|---|---|
| Amazement | 0 | |
| Amusement | 3 | 5, 3, 5 |
| Astonishment | 0 | |
| Eagerness | 2 | 5, 4 |
| Enthusiasm | 0 | |
| Excitement | 1 | 4 |
| Exhilaration | 1 | 5 |
| Exuberance | 1 | 4 |
| Fun | 0 | |
| Glee | 5 | 3, 4, 6, 4, 4 |
| Hilarity | 3 | 4, 4, 5 |
| Merriment | 1 | 5 |
| Mirth | 3 | 6, 4, 5 |
| Surprise | 0 | |
| Thrill | 1 | 4 |
| Wonder | 0 | |

The associated probabilities of chance selection of the same emotional descriptor by independent connotative judges, according to equation (I), are as follows:

| Number of Judges Selecting the Same Category | Probability of Chance Selection |
|---|---|
| 0 | 0.258 |
| 1 | 0.361 |
| 2 | 0.241 |
| 3 | 0.102 |
| 4 | 0.030 |
| 5 | 0.007 |

In this example, only one emotional descriptor, "Glee," has been selected by enough independent connotative judges (5 judges) to meet the test of statistical significance, and is retained in the main database 12 as a connotative association for the word or phrase being evaluated. For any given word or phrase, selection of emotional descriptors from one emotional category does not preclude selection of emotional descriptors from other emotional categories. Any given word or phrase is apt to evoke several kinds of emotional response simultaneously. Therefore, the same word or phrase is also evaluated in an identical manner on the other seven categories of emotional connotations listed in Table 2. Thus, the word or phrase may, or may not, finish with more connotative emotional descriptors added when the data collection procedure has been completed.

In a preferred embodiment of the invention, words and phrases that receive no votes from the connotative judges on any of the connotative groupings, or too few votes on all eight connotative groupings to meet the test of statistical significance, are tagged as "non-connotative," so that such words may be optionally excluded from further analysis or database querying.

As for connotative intensity, all 21 scores in the above example are valid, not just the 5 scores for the specific emotional descriptor "Glee," because the 21 Field-5 scores represent the general emotional category, "Amusement/Excitement," which subsumes the specific emotional descriptor, "Glee."

By completion of data analysis, each of the eight emotional variables contains one mean (i.e., average) intensity score for each word or phrase. An unbiased estimate of the variance of the sample of 21 anchored intensity scores in Table 9 is calculated according to the following variance formula:

$$s^2 = \frac{\sum (X - \overline{X})^2}{(n-1)}$$

from which the standard error of the mean for the sample is estimated in accordance with the following formula:

$$s_{\overline{x}} = \frac{s}{\sqrt{n}}$$

where:

$X$ is an independent connotative judge's score $\overline{X}$ is the sample mean -continued n is the number of scores in the sample $s^2$ is an inbiased estimate of the variance of the sample s is the sample standard deviation $s_{\bar{x}}$ is the standard error of the mean.

In the present example, the average of the 21-score sample of Field-5 data presented in Table 9 is 4.4. The standard deviation of the 21-score sample is approximately 0.81, which, when divided by 21 yields a standard error of the mean of about 0.177, for a 95% confidence level about the mean of ±0.35. Further accuracy is obtained by programming the computer to identify and purge "outlier" scores. This is accomplished by comparing each score with the mean and purging scores that are higher or lower than a statistically specified distance from the mean.

In a preferred embodiment of the invention, words and phrases that receive no Field-4 emotional descriptor votes from the connotative judges on any of the eight emotional categories (and therefore no Field-5 intensity scores) are tagged as "non-connotative," so that, at the user's option, such words may be excluded from further analysis or database querying.

Identifying Human Interest Area Relating to a Record

The Human Interest fields 48 may be defined in the same manner as the Field 4 data of Table 5. However, because the human interest fields are less subjective and relate more directly to denotative context, in a preferred embodiment assigned editors are used to define most of the human interest fields. However several variables on the Table 3 list of human interest fields, such as "Abstract-Concrete," "Power," and "Activity" are better left to evaluation by panels of connotative judges. These fields are defined as described above for the field 4 data and are subject to the same or similar data integrity procedures.

A preferred embodiment of the invention such as the one described herein is both human-judgment based and dynamic, reflecting the human and dynamic nature of language. Since the data provided by the connotative judges are key to the system and method, one may wish to establish a program of continuous update of the database, either at prescribed intervals or on an ongoing basis, such as through a World Wide Web site. In this way, connotative judges would be able to supply data continuously, with turnover of connotative judges easily managed, and the database, particularly the connotative component, kept completely up to date.

In one embodiment participating judges periodically or aperiodically receive a mini-database via e-mail or by logging onto a web site. The mini-database serves as the questionnaire allowing the judge to enter a code for the connotative association (see table 6) for a given emotional category (see table 2). The results are then processed as described above for data integrity (see questionnaire processing 90 of FIG. 9 and related description).

By practicing the above method and system of the present invention, a complete and accurate connotative language reference map and database is constructed in any language, which then can be used to construct connotative equivalents of denotative language reference resources, such as connotative dictionaries, connotative thesauruses, and connotative text analysis tools. In addition, the anchored system of judgment elicitation may be applied in any field requiring accuracy in the elicitation of qualitative data where Likert-type scaling is applicable.

Meritorious and Advantageous Effects

One advantage of the system for identifying connotative meanings is that reliable associations, including connotative descriptions and intensities, are identified for given words and phrases in each of their denotative contexts. Another advantage is that the associations are maintained over time with changes in the vernacular or other changes/occurrences affecting connotative association.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A computer system for executing a computer program implementing a connotative language reference, the system comprising:
   a data base having a plurality of records, each record including:
      a first field for identifying a term;
      a second field for identifying a denotative context for the term in the first field;
      a plurality of connotative fields, each one of the plurality of connotative fields storing a code corresponding to one selection of a plurality of predefined connotative selections, the plurality of predefined connotative selections comprising an indicator of no connotative association and a plurality of sets of emotional descriptors, each one set of the plurality of sets corresponding to a mutually exclusive one emotional category of a plurality of emotional categories;
   the system further comprising:
      means for retrieving a set of connotative synonyms from the records of the data base.

2. The system of claim 1, in which the retrieving means comprises means for retrieving a set of connotative synonyms corresponding to an input term, wherein there is at least one record in the data base for the input term, said at least one record having a first code corresponding to a first emotional descriptor among the plurality of sets of emotional descriptors.

3. The system, of claim 2, wherein each one of the retrieved set of connotative synonyms corresponds to a record in the data base which includes the first code.

4. The system of claim 1, in which each record of the data base further comprises:
   a contextual field for identifying a human interest area associated with the term, the identified human interest area being from a predefined set of human interest areas;
   the system further comprising:
      means for displaying a plurality of filtering options corresponding to predefined set of human interest areas;
      the retrieving means comprising means for processing a selection of filtering options to identify an output record from the data base which includes an entry among the output record's plurality of contextual fields which corresponds to the selection of filtering options.

5. The system of claim 1, in which each record of the data base further comprises:

a contextual field for identifying a special diction area associated with the term, the identified special diction area being from a predefined set of special diction areas;

the system further comprising:

means for displaying a plurality of filtering options corresponding to predefined set of special diction areas;

the retrieving means comprising means for processing a selection of filtering options to identify an output record from the data base which includes an entry among the output record's plurality of contextual fields which corresponds to the selection of filtering options.

6. The system of claim 1, in which each record of the data base further comprises:

a power field for identifying a power rating associated with the term; the system further comprising:

means for displaying a filtering option corresponding to a scale of power ratings;

the retrieving means comprising means for processing a selection of filtering options to identify an output record from the data base which includes an entry among the output record's plurality of contextual fields which corresponds to the selection of filtering options.

7. The system of claim 1, in which each record of the data base further comprises:

an activity power field for identifying an activity rating associated with the term;

the system further comprising:

means for displaying a filtering option corresponding to a scale of activity ratings;

the retrieving means comprising means for processing a selection of filtering options to identify an output record from the data base which includes an entry among the output record's plurality of contextual fields which corresponds to the selection of filtering options.

8. The system of claim 1, in which each record of the data base further comprises:

an abstract field for identifying a rating along an abstract to concrete scale, the rating being associated with the term;

the system further comprising:

means for displaying a filtering option corresponding to the abstract to concrete scale;

the retrieving means comprising means for processing a selection of filtering options to identify an output record from the data base which includes an entry among the output record's plurality of contextual fields which corresponds to the selection of filtering options.

9. The system of claim 1, in which each record of the data base further comprises:

for each one of the plurality of connotative fields, an intensity field for identifying an intensity rating associated with the corresponding connotative field;

said displaying means for displaying the intensity field for connotative selection of said given record.

10. The system of claim 1, further comprising:

means for displaying a plurality of filtering options;

the retrieving means comprising means for processing a selection of displayed filtering options to identify an output record from the data base corresponding to the selection of filtering options.

11. The system of claim 1, further comprising:

means for updating the data base to change the connotative selection associated with the given record.

12. The system of claim 1, further comprising:

means for storing said plurality of predefined connotative selections; and computer executable means of instructions for associating each said code of said plurality of connotative fields to a corresponding one of said plurality of predefined connotative selections.

13. The system of claim 1, further comprising:

displaying the plurality of filtering options; and updating the abstract field.

* * * * *